US010520696B2

(12) United States Patent
 Kanzaki

(10) Patent No.: US 10,520,696 B2
(45) Date of Patent: Dec. 31, 2019

(54) IN-VEHICLE CAMERA LENS UNIT

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 15/580,689

(22) PCT Filed: Jun. 10, 2016

(86) PCT No.: PCT/JP2016/067387
  § 371 (c)(1),
  (2) Date: Dec. 8, 2017

(87) PCT Pub. No.: WO2016/199897
  PCT Pub. Date: Dec. 15, 2016

(65) Prior Publication Data
  US 2018/0188473 A1    Jul. 5, 2018

(30) Foreign Application Priority Data

Jun. 11, 2015 (JP) ................. 2015-117907

(51) Int. Cl.
  *G02B 7/02*   (2006.01)
  *G02B 9/62*   (2006.01)
  *G02B 13/18*  (2006.01)
(52) U.S. Cl.
  CPC .............. *G02B 7/028* (2013.01); *G02B 9/62* (2013.01); *G02B 13/18* (2013.01); *B60Y 2400/3015* (2013.01)

(58) Field of Classification Search
  CPC . G02B 3/04; G02B 7/02; G02B 7/028; G02B 9/62; G02B 9/34; G02B 13/18; G02B 13/0045; G02B 13/00; B60Y 2400/3015
  (Continued)

(56) References Cited

U.S. PATENT DOCUMENTS 4,787,721 A * 11/1988 Fukushima .............. G02B 9/60
                                                        359/713
2009/0067063 A1 * 3/2009 Asami ................. G02B 13/146
                                                        359/772
(Continued)

FOREIGN PATENT DOCUMENTS

CN        101149465        3/2008
CN        101387739        3/2009
(Continued)

OTHER PUBLICATIONS

English translation of JP 2000137164, machine translated on Nov. 13, 2018.*
(Continued)

*Primary Examiner* — Jie Lei
(74) *Attorney, Agent, or Firm* — JCIPRNET

(57) ABSTRACT

An in-vehicle camera lens unit having stable temperature characteristics even when lenses are mounted in a resin holder is provided. With an in-vehicle camera lens unit, a first lens, a second lens, a third lens, a diaphragm, a fourth lens, a fifth lens, and a sixth lens, which are disposed in this order from an object side to an image side, are held in a resin holder. The first lens 1, the second lens, the fifth lens, and the sixth lens are glass lenses, and of the third lens and the fourth lens disposed on both sides of the diaphragm, the third lens, which is a meniscus lens, is a plastic lens, and the fourth lens, which is a double convex lens, is a glass lens.

7 Claims, 2 Drawing Sheets

(58) Field of Classification Search
USPC ........ 359/713, 682, 752, 772, 756, 757, 760
See application file for complete search history.

(56) References Cited

U.S. PATENT DOCUMENTS

2015/0323708 A1* 11/2015 Hashimoto ............ G02B 7/021
359/718
2017/0108665 A1* 4/2017 Huang ............... G02B 13/0045

FOREIGN PATENT DOCUMENTS

| | | |
|---|---|---|
| CN | 102621654 | 8/2012 |
| EP | 1903368 | 3/2008 |
| JP | H04-174810 | 6/1992 |
| JP | H09-304694 | 11/1997 |
| JP | 2000-019393 | 1/2000 |
| JP | 2000-137164 | 5/2000 |
| JP | 2008160348 | 7/2008 |
| JP | 2009-086644 | 4/2009 |
| JP | 2010224315 | 10/2010 |
| JP | 2014-119707 | 6/2014 |
| JP | 2014206740 | 10/2014 |
| JP | 2015-034922 | 2/2015 |
| JP | 2015-040945 | 3/2015 |
| WO | 2014167994 | 10/2014 |

OTHER PUBLICATIONS

English translation of JP H04174810, machine translated on Nov. 13, 2018.*
"International Search Report (Form PCT/ISA/210) of PCT/JP2016/067387", dated Jul. 26, 2016, with English translation thereof, pp. 1-4.
"Search Report of Europe Counterpart Application", dated Jan. 30, 2019, p. 1-p. 5.
Office Action of China Counterpart Application, with English translation thereof, dated Jul. 25, 2019, pp. 1-13.
"Office Action of Japan Notice of Allowance", with English translation thereof, dated May 28, 2019, pp. 1-4.

* cited by examiner

IN-VEHICLE CAMERA LENS UNIT

CROSS-REFERENCE TO RELATED APPLICATION

This application is a 371 application of international PCT application serial no. PCT/JP2016/067387, filed on Jun. 10, 2016, which claims the priority benefit of Japan application no. JP 2015-117907, filed on Jun. 11, 2015. The entirety of each of the abovementioned patent applications is hereby incorporated by reference herein and made a part of this specification.

TECHNICAL FIELD

The present invention relates to an in-vehicle camera lens unit.

BACKGROUND ART

For example, in order to reduce a dead angle from a driver of a vehicle, mounting of an in-vehicle camera on a vehicle is being proposed. With respect to an in-vehicle camera lens unit used in such an in-vehicle camera, from the standpoint of reducing cost, a configuration is proposed in which all the lenses, including a lens closest to an object side, are plastic lenses having a high chemical resistance and the like (see Patent Literature 1).

CITATIONS LIST

Patent Literature

Patent Literature 1: JP 2015-40945 A

SUMMARY OF INVENTION

Technical Problems

An in-vehicle camera is used in a wide temperature range from a low temperature to a high temperature, but a plastic lens has poor temperature characteristics. Accordingly, the in-vehicle camera lens unit described in Patent Literature 1 has a problem that resolution or the like is reduced when the temperature is low and when the temperature is high.

On the other hand, a glass lens has good temperature characteristics. However, also in the case of using a glass lens, if the glass lens is mounted in a resin holder (lens barrel), there is a problem that resolution or the like is reduced due to expansion or contraction of the holder caused by a change in the temperature.

In view of the problems described above, an object of the present invention is to provide an in-vehicle camera lens unit having stable temperature characteristics even in a case where lenses are mounted in a resin holder.

Solutions to Problems

To achieve the above object, at least an embodiment of the present invention provides an in-vehicle camera lens unit including a first lens, a second lens, a third lens, a diaphragm, a fourth lens, a fifth lens, and a sixth lens that are disposed in such an order from an object side to an image side while being held in a holder with a cylindrical shape. The first lens is a positive lens with a meniscus shape having a convex surface facing the object side. The second lens is a negative lens with a meniscus shape having a concave surface facing the image side. The third lens is a lens with a meniscus shape having a concave surface facing the object side. The fourth lens is a lens with convex surfaces facing the object side and the image side. The fifth lens is a lens with concave surfaces facing the object side and the image side. The sixth lens is a lens with convex surfaces facing the object side and the image side. The fifth lens and the sixth lens are a cemented lens. The holder is made of resin. The first lens, the second lens, the fifth lens, and the sixth lens are glass lenses. One of the third lens and the fourth lens is a plastic lens.

According to at least an embodiment of the present invention, aberration is reduced by configuring the fifth lens and the sixth lens to be a cemented lens, for example, and the temperature characteristics are improved by configuring the first lens, the second lens, the fifth lens, and the sixth lens to be glass lenses. Here, the holder holding each lens is made of resin, but one of the third lens and the fourth lens is a plastic lens. Accordingly, even if the position of a lens is changed due to expansion or contraction of the holder caused by a change in the temperature, an influence of such a change can be corrected by a shift in the focal position caused by a change in the shape or a change in the refractive index of the plastic lens. Moreover, because one of the third lens and the fourth lens disposed on both sides of the diaphragm is configured to be a plastic lens, a shift in the focal position caused by a change in the shape or a change in the refractive index of the plastic lens is great. Accordingly, an influence of expansion or contraction of the holder caused by a change in the temperature can be effectively corrected by a change in the shape or a change in the refractive index of the plastic lens. Therefore, even if the holder is made of resin, the in-vehicle camera lens unit as a whole has stable temperature characteristics, and reduction in the resolution or the like is not easily caused in a wide temperature range from a low temperature to a high temperature. Moreover, compared to a case where all the lenses are glass lenses, cost can be reduced by configuring one or some of the lenses to be plastic lenses.

At least an embodiment of the present invention may adopt a mode where the third lens is a plastic lens, and the fourth lens is a glass lens. In the case where the fourth lens, which is a double convex lens, is configured to be a plastic lens, a situation may easily arise where a shift in the focal position caused by a change in the temperature is too great, but in the case of the third lens, which is a meniscus lens, a shift in the focal position caused by a change in the temperature is moderate. Therefore, an influence of expansion or contraction of the holder caused by a change in the temperature can be effectively corrected by a change in the characteristics of the plastic lens.

In at least an embodiment of the present invention, an object-side lens surface and an image-side lens surface of the third lens are preferably aspherical surfaces. According to such a configuration, astigmatism and the like can be reduced.

In at least an embodiment of the present invention, the third lens is a negative lens, for example.

In at least an embodiment of the present invention, in a relationship between a spatial frequency and MTF in a temperature range of $-40°$ C. to $+105°$ C., with respect to the spatial frequency is preferably 60 lp/mm, an OTF value is preferably 0.5 or more. With such a resolution, an appropriate image can be obtained by an in-vehicle camera in a wide temperature range.

In at least an embodiment of the present invention, an F value of an entire lens system including the first lens, the second lens, the third lens, the fourth lens, the fifth lens, and the sixth lens is preferably 1.6 or less. According to such a configuration, a bright image can be obtained by an in-vehicle camera.

Advantageous Effects of Invention

According to the in-vehicle camera lens unit of at least an embodiment of the present invention, aberration is reduced by configuring the fifth lens and the sixth lens to be a cemented lens, for example, and the temperature characteristics are improved by configuring the first lens, the second lens, the fifth lens, and the sixth lens to be glass lenses. Here, the holder holding each lens is made of resin, but one of the third lens and the fourth lens is a plastic lens. Accordingly, even if the position of a lens is changed due to expansion or contraction of the holder caused by a change in the temperature, an influence of such a change can be corrected by a shift in the focal position caused by a change in the shape or a change in the refractive index of the plastic lens. Moreover, because one of the third lens and the fourth lens disposed on both sides of the diaphragm is configured to be a plastic lens, a shift in the focal position caused by a change in the shape or a change in the refractive index of the plastic lens is great. Accordingly, an influence of expansion or contraction of the holder caused by a change in the temperature can be effectively corrected by a change in the shape or a change in the refractive index of the plastic lens. Therefore, even if the holder is made of resin, the in-vehicle camera lens unit as a whole has stable temperature characteristics, and reduction in the resolution or the like is not easily caused in a wide temperature range from a low temperature to a high temperature. Moreover, compared to a case where all the lenses are glass lenses, cost can be reduced by configuring one or some of the lenses to be plastic lenses.

DESCRIPTION OF EMBODIMENTS

Figure 1:
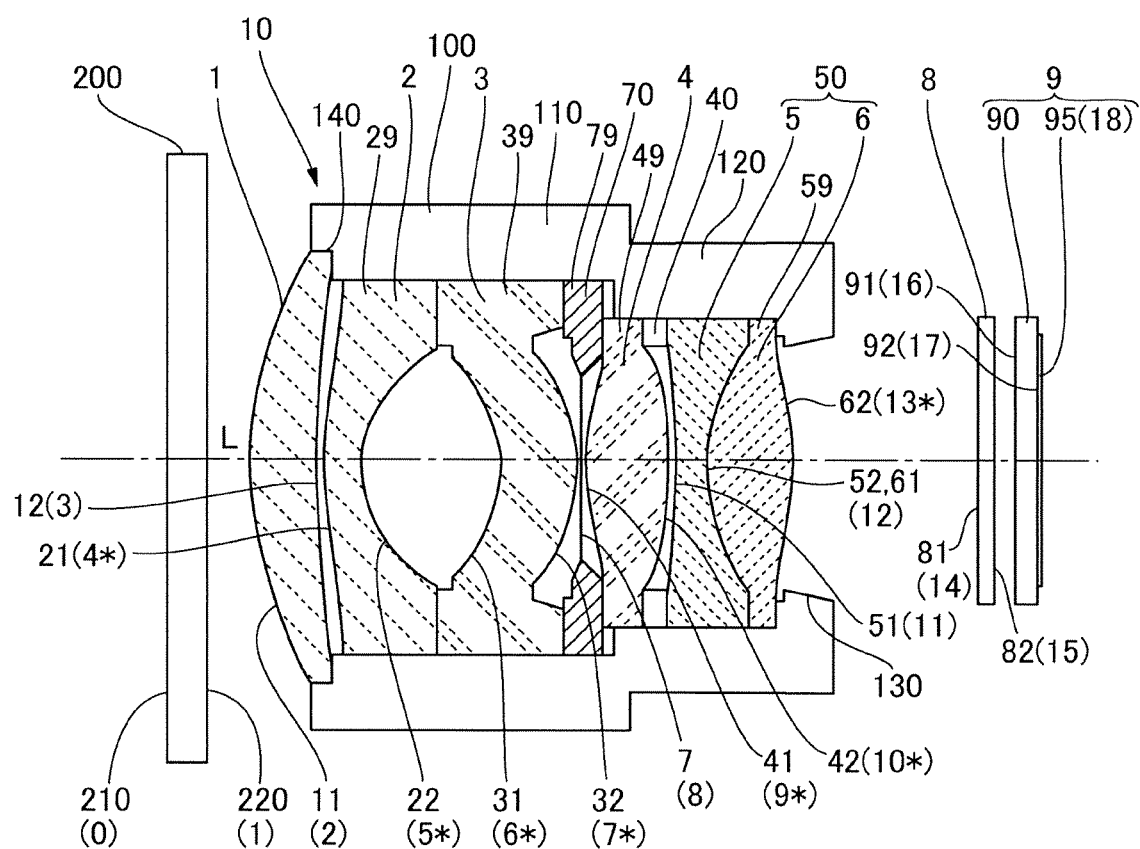
FIG. 1 is an explanatory diagram of an in-vehicle camera lens unit to which the present invention is applied.

Hereinafter, an in-vehicle camera lens unit to which the present invention is applied will be described with reference to the drawings.

Additionally, in FIG. 1 and Table 1 referred to below, respective surfaces 0 to 10 are indicated in parentheses, and are the surfaces below. Furthermore, among the surfaces, aspherical surfaces have "*" added behind the surface number.

Surface 0 (0): object-side surface 210 of translucent cover 200
Surface 1 (1): image-side surface 220 of translucent cover 200
Surface 2 (2): object-side lens surface 11 of first lens 1
Surface 3 (3): image-side lens surface 12 of first lens 1
Surface 4 (4*): object-side lens surface 21 of second lens 2
Surface 5 (5*): image-side lens surface 22 of second lens 2
Surface 6 (6*): object-side lens surface 31 of third lens 3
Surface 7 (7*): image-side lens surface 32 of third lens 3
Surface 8 (8): diaphragm 7
Surface 9 (9*): object-side lens surface 41 of fourth lens 4
Surface 10 (10*): image-side lens surface 42 of fourth lens 4
Surface 11 (11): object-side lens surface 51 of fifth lens 5
Surface 12 (12): image-side lens surface 52 of fifth lens 5, object-side lens surface 61 of sixth lens 6
Surface 13 (13*): image-side lens surface 62 of sixth lens 6
Surface 14 (14): object-side surface 81 of infrared cut filter 8
Surface 15 (15): image-side surface 82 of infrared cut filter 8
Surface 16 (16): object-side surface 91 of element cover 90 of image sensor 9
Surface 17 (17): image-side surface 92 of element cover 90 of image sensor 9
Surface 18 (18): imaging surface 95 of image sensor 9

(Configuration of in-Vehicle Camera Lens Unit 10)

FIG. 1 is an explanatory diagram of an in-vehicle camera lens unit 10 to which the present invention is applied. The in-vehicle camera lens unit 10 shown in FIG. 1 includes a first lens 1, a second lens 2, a third lens 3, a diaphragm 7, a fourth lens 4, a fifth lens 5, and a sixth lens 6 arranged in this order from an object side to an image side. A plate-shaped translucent cover 200 is disposed on the object side of the in-vehicle camera lens unit 10, and a plate-shaped infrared cut filter 8 and an image sensor 9 are disposed on the image side of the in-vehicle camera lens unit 10, in this order from the object side to the image side. The image sensor 9 includes an imaging surface 95 on a side of a translucent element cover 90 opposite from the in-vehicle camera lens unit 10.

In the present embodiment, an image-side lens surface 52 of the fifth lens 5 and an object-side lens surface 61 of the sixth lens 6 are joined by an adhesive, and the fifth lens 5 and the sixth lens 6 form a cemented lens 50.

With the in-vehicle camera lens unit 10 of the present embodiment, the first lens 1, the second lens 2, the third lens 3, the diaphragm 7, the fourth lens 4, the fifth lens 5, and the sixth lens 6 are held by a circular cylindrical holder 100 (lens barrel). Here, the first lens 1 has the largest outer diameter among the first lens 1, the second lens 2, the third lens 3, the diaphragm 7, the fourth lens 4, the fifth lens 5, and the sixth lens 6. The second lens 2 and the third lens 3 have the same outer diameter, and the fourth lens 4, the fifth lens 5, and the sixth lens 6 have the same outer diameter. The outer diameter of the second lens 2 and the third lens 3 is smaller than that of the first lens 1, and larger than that of the fourth lens 4, the fifth lens 5, and the sixth lens 6. In accordance with such a configuration, an object-side large diameter portion 110, and a small diameter portion 120 formed on the image side of the large diameter portion 110 while being coaxial with the large diameter portion 110 are formed to the holder 100. An annular protruding portion 130 protruding inward in a radial direction is formed on an image-side end portion of the small diameter portion 120.

The cemented lens 50 (fifth lens 5 and sixth lens 6) and the fourth lens 4 are disposed inside the small diameter portion 120 in this order from the image side to the object side, and a flange portion 59, which is an outer circumferential edge portion of the cemented lens 50, is in contact with the protruding portion 130 from the object side. In addition, an annular intermediate ring 40 is disposed between the flange portion 59 of the cemented lens 50 and a flange portion 49, which is an outer circumferential edge portion of the fourth lens 4.

A light shielding member 70 including the diaphragm 7, the third lens 3, and the second lens 2 are disposed inside the large diameter portion 110 in this order from the image side to the object side, and an outer circumferential edge portion 79 of the light shielding member 70 is in contact with the flange portion 49 of the fourth lens 4 from the object side. Furthermore, a flange portion 39, which is an outer circumferential edge portion of the third lens 3, is in contact with the outer circumferential edge portion 79 of the light shielding member 70 from the object side, and a flange portion 29, which is an outer circumferential edge portion of the second lens 2, is in contact with the flange portion 39 of the third lens 3 from the object side. In this state, the second lens 2 is fixed to the holder 100 by means of an adhesive or caulking, for example, and thus, the third lens 3, the diaphragm 7, the fourth lens 4, and the cemented lens 50 (fifth lens 5 and sixth lens 6) are held between the second lens 2 and the protruding portion 130.

A step portion 140 is formed on an object-side end portion of the large diameter portion 110, and the first lens 1 is fixed to the step portion 140 by means of an adhesive or caulking, for example.

The constitutions of the lenses and the like of the in-vehicle camera lens unit 10 configured in the above manner are as shown in Table 1 below.

TABLE 1

| Surface No. | Radius of Curvature | Surface Spacing | Refractive Index | Radius |
|---|---|---|---|---|
| (0) | Infinity | Infinity | | 0.000 |
| (1) | Infinity | 1.120 | | 7.808 |
| (2) | 8.73083908 | 1.929 | 1.88 | 5.647 |
| (3) | 10.4815663 | 0.117 | | 4.800 |
| (4*) | 6.59320433 | 0.900 | 1.70 | 4.428 |
| (5*) | 3.08539602 | 3.592 | | 3.264 |
| (6*) | −3.4679938 | 2.300 | 1.54 | 2.923 |
| (7*) | −4.0126109 | 0.100 | | 3.042 |
| (8) | Infinity | 0.100 | | 2.361 |
| (9*) | 6.22437904 | 1.496 | 1.70 | 2.984 |
| (10*) | −426.1094 | 0.453 | | 3.203 |
| (11) | −21.881525 | 0.800 | 1.76 | 3.262 |
| (12) | 5.71634845 | 2.685 | 1.70 | 3.485 |
| (13*) | −6.3092905 | 4.731 | | 3.631 |
| (14) | Infinity | 0.448 | 1.51 | 3.687 |
| (15) | Infinity | 0.560 | | 3.691 |
| (16) | Infinity | 0.448 | 1.51 | 3.698 |
| (17) | Infinity | 0.140 | | 3.702 |
| (18) | Infinity | 0.000 | | 3.368 |

| Surface No. | K | A4 | A6 | A8 | A10 | A12 |
|---|---|---|---|---|---|---|
| (0) | | | | | | |
| (1) | | | | | | |
| (2) | | | | | | |
| (3) | | | | | | |
| (4*) | −1.00E+00 | 1.21E−03 | −1.01E−04 | 3.0514E−06 | −2.30E−07 | 6.56E−09 |
| (5*) | −1.00E+00 | 5.75E−03 | 2.41E−04 | −4.98E−05 | 9.82E−06 | −7.44E−07 |
| (6*) | 0 | 6.13E−03 | −4.50E−04 | 2.98E−05 | 8.17E−07 | 0.00E+00 |
| (7*) | 0 | 1.68E−03 | 2.80E−05 | 4.09E−06 | 4.55E−07 | 0.00E+00 |
| (8) | | | | | | |
| (9*) | 0 | −3.35E−03 | −8.13E−05 | 4.56E−06 | −1.29E−06 | −5.94E−08 |
| (10*) | 0 | −3.67E−03 | −8.17E−05 | 4.18E−06 | −1.03E−06 | −2.29E−08 |
| (11) | | | | | | |
| (12) | | | | | | |
| (13*) | 0 | 1.83E−03 | −5.28E−05 | 1.60E−05 | −1.29E−06 | 3.07E−08 |
| (14) | | | | | | |
| (15) | | | | | | |
| (16) | | | | | | |
| (17) | | | | | | |
| (18) | | | | | | |

In the upper column in Table 1, the radius of curvature, the surface spacing, the refractive index, and the radius of each surface are shown. In the lower column in Table 1, aspherical coefficients and the like when the shape of an aspherical surface, among the surfaces, is expressed by the following expression (Equation 1) are shown. In the following expression, the axis in an optical axis L direction is given as Z, the height in a direction perpendicular to the optical axis L as r, the conical coefficient (conic coefficient) as K, and the center of curvature as c. The unit of each value is mm.

$$Z = \frac{cr^2}{1 + \sqrt{1 - (1+K)c^2 r^2}} + \sum_{n=3}^{16} A_n |r^n| \quad \text{[Equation 1]}$$

As can be seen from FIG. 1 and Table 1, the first lens 1 of the in-vehicle camera lens unit 10 of the present embodiment is a positive lens with a meniscus shape having a convex surface facing the object side. In the present embodiment, an object-side lens surface 11 (surface 2 (2)) of the first lens 1 is a convex spherical surface, and an image-side lens surface 12 (surface 3 (3)) of the first lens 1 is a concave spherical surface.

The second lens 2 is a negative lens with a meniscus shape having a concave surface facing the image side. An object-side lens surface 21 (surface 4 (4*)) of the second lens 2 is a convex aspherical surface, and an image-side lens surface 22 (surface 5 (5*)) of the second lens 2 is a concave aspherical surface.

The third lens 3 is a lens with a meniscus shape having a concave surface facing the object side. An object-side lens surface 31 (surface 6 (6*)) of the third lens 3 is a concave aspherical surface, and an image-side lens surface 32 (surface 7 (7*)) of the third lens 3 is a convex aspherical surface. In the present embodiment, the third lens 3 is a negative lens with a negative power.

The fourth lens 4 is a lens with convex surfaces facing the object side and the image side. An object-side lens surface 41 (surface 9 (9*)) of the fourth lens 4 is a convex aspherical surface, and an image-side lens surface 42 (surface 10 (10*)) of the fourth lens 4 is a convex aspherical surface.

The fifth lens 5 is a lens with concave surfaces facing the object side and the image side, and the sixth lens 6 is a lens with convex surfaces facing the object side and the image side, and the image-side lens surface 52 of the fifth lens 5 and the object-side lens surface 61 of the sixth lens 6 are joined by an adhesive. With such a cemented lens 50, an object-side lens surface 51 (surface 11 (11)) of the fifth lens 5 is a concave spherical surface, and the image-side lens surface 52 (surface 12 (12)) of the fifth lens 5 is a concave spherical surface. The object-side lens surface 61 (surface 12 (12)) of the sixth lens 6 is a convex spherical surface, and an image-side lens surface 62 (surface 13 (13*)) of the sixth lens 6 is a convex aspherical surface.

The first lens 1, the second lens 2, the fifth lens 5, and the sixth lens 6 are glass lenses. One of the third lens 3 and the fourth lens 4 is a plastic lens. In the present embodiment, of the third lens 3 and the fourth lens 4, the third lens 3 is a plastic lens, and the fourth lens 4 is a glass lens.

With the in-vehicle camera lens unit 10 configured in the above manner, an F value of the entire lens system including the first lens 1, the second lens 2, the third lens 3, the fourth lens 4, the fifth lens 5, and the sixth lens 6 is 1.6 or less.

(MTF Characteristics)

Figure 2A:
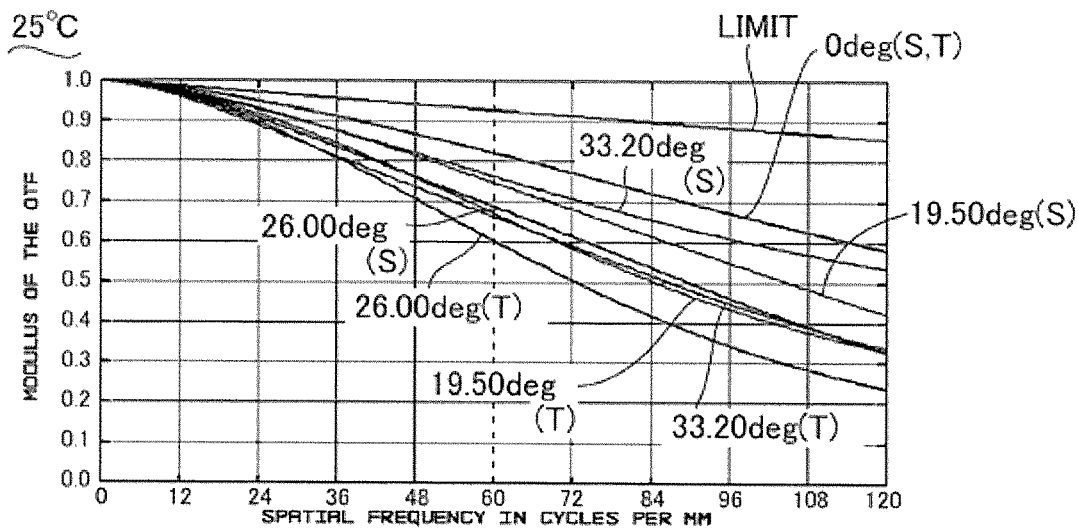
FIGS. 2A, 2B and 2C are explanatory diagrams showing MTF characteristics of the in-vehicle camera lens unit to which the present invention is applied.
Figure 2B:
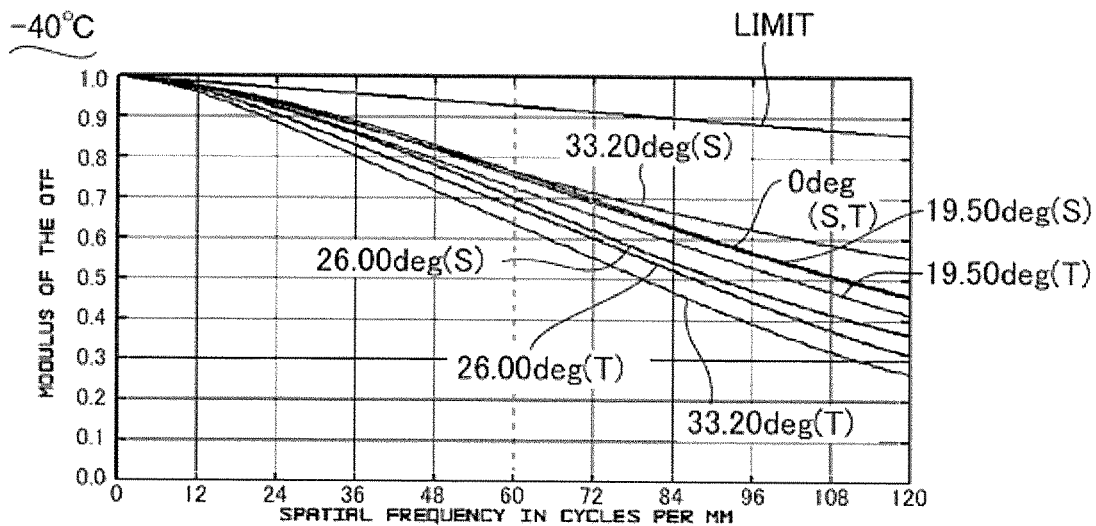
Figure 2C:
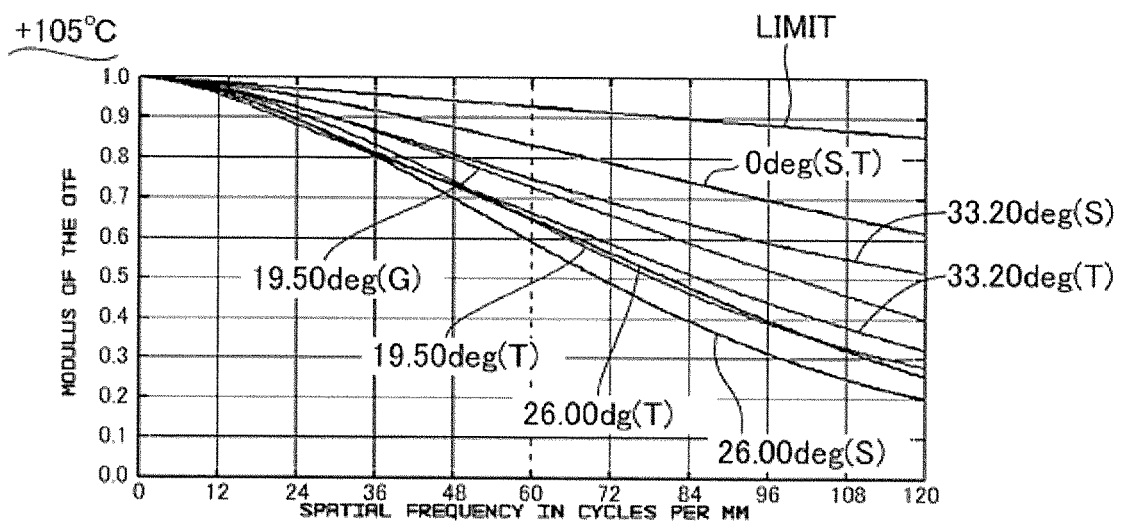

FIGS. 2A, 2B and 2C are explanatory diagrams showing MTF characteristics of the in-vehicle camera lens unit 10 to which the present invention is applied, and FIGS. 2A, 2B and 2C are explanatory diagrams showing the MTF characteristics at a normal temperature (+25° C.), an explanatory diagram showing the MTF characteristics at 40° C., and an explanatory diagram showing the MTF characteristics at +105° C., respectively. Additionally, in FIGS. 2A, 2B and 2C, absolute values (MTF (Modulation Transfer Function)) of OTF (Optical Transfer Function) at viewing angles of 0 deg, 19.50 deg, 26.00 deg, and 33.20 deg are plotted against spatial frequency, and S is added to characteristics in a sagittal direction, and T is added to characteristics in a tangential direction. Moreover, a wave-optical limit value is shown in FIGS. 2A, 2B and 2C as LIMIT. Additionally, the OTF is Fourier transform of emitted light/Fourier transform of incident light, and indicates a contrast reduction rate.

As shown in FIGS. 2A, 2B and 2C, the contrast is reduced as the spatial frequency is shifted to a higher frequency, and when the standard spatial frequency of the spatial frequency is 60 lp/mm, the OTF value is 0.5 or more, or 0.6 or more, in a temperature range of −40° C. to +105° C.

(Main Effects of Present Embodiment)

As described above, with the in-vehicle camera lens unit 10 of the present embodiment, the fifth lens 5 and the sixth lens 6 are configured to be the cemented lens 50, and the object-side lens surface 31 and the image-side lens surface 32 of the third lens 3 are configured to be aspherical surfaces, so as to reduce aberration. Furthermore, the first lens 1, the second lens 2, the fifth lens 5, and the sixth lens 6 of the in-vehicle camera lens unit 10 are configured to be glass lenses so as to improve the temperature characteristics.

The holder 100 holding each of the lenses is made of resin, but one of the third lens 3 and the fourth lens 4 (i.e., third lens 3) is a plastic lens. Accordingly, even if the position of a lens is changed due to expansion or contraction of the holder 100 caused by a change in the temperature, the influence of such a change can be corrected by a shift in the focal position caused by a change in the characteristics of the plastic lens (third lens 3). That is, when the holder 100 is made of resin, the linear expansion coefficient is several times larger than when the holder 100 is made of aluminum, but the linear expansion coefficient of a plastic lens is close to 10 times that of a glass lens. Accordingly, even if the position of a lens is changed due to expansion or contraction of the holder 100 caused by a change in the temperature, the influence of such a change can be corrected by a shift in the focal position caused by a change in the refractive index or a change in the shape, such as expansion or contraction, of the plastic lens (third lens 3).

Furthermore, in the present embodiment, one of the third lens 3 and the fourth lens 4 (i.e., third lens 3) disposed on both sides of the diaphragm 7 is a plastic lens, and thus, a shift in the focal position caused by a change in the shape or a change in the refractive index of the plastic lens is great. Accordingly, the influence of expansion or contraction of the holder 100 caused by a change in the temperature can be effectively corrected by a change in the shape or a change in the refractive index of the plastic lens. Therefore, even when the holder 100 is made of resin, the in-vehicle camera lens unit 10 as a whole has stable temperature characteristics, and reduction in the resolution or the like is not easily caused in a wide temperature range from a low temperature to a high temperature. Accordingly, the in-vehicle camera lens unit 10 can be realized for which, when the standard spatial frequency of the spatial frequency is 60 lp/mm, the OTF value is 0.5 or more in a temperature range of −40° C. to +105° C.

Moreover, if only plastic lenses are used, because the refractive index is low, a total track length has to be increased from the standpoint of aberration correction so as to increase the power, and satisfactory F value, total track length, and aberration correction (resolving power) become difficult to achieve; however, with the in-vehicle camera lens unit 10 of the present embodiment, the first lens 1, the second lens 2, the fifth lens 5, and the sixth lens 6 are glass lenses. Accordingly, the F value of the entire lens system including the first lens 1, the second lens 2, the third lens 3, the fourth lens 4, the fifth lens 5, and the sixth lens 6 is 1.6 or less. An in-vehicle camera may thus obtain a bright image.

Furthermore, an in-vehicle camera uses light in a wide wavelength band (420 nm to 700 nm), and thus, chromatic aberration correction in a wide wavelength range is desired, but it is difficult to obtain, only by plastic lenses, enough materials with different refractive index dispersion so as to be able to reduce chromatic aberration. However, according to the present embodiment, glass lenses and a plastic lens with different refractive indices are used in combination, and chromatic aberration can be reduced. Moreover, compared to a case where all the lenses are glass lenses, cost of the in-vehicle camera lens unit 10 can be reduced by configuring one or some of the lenses to be plastic lenses.

Moreover, in the present embodiment, of the third lens 3, which is a meniscus lens, and the fourth lens 4, which is a double convex lens, the third lens 3 is a plastic lens, and the fourth lens 4 is a glass lens. Accordingly, the influence of expansion or contraction of the holder 100 caused by a change in the temperature can be effectively corrected by a change in the characteristics of the plastic lens. That is, if the fourth lens 4, which is a double convex lens, is configured to be the plastic lens, a situation may easily arise where a shift in the focal position caused by a change in the temperature is too great, but if the third lens 3, which is a meniscus lens, is the plastic lens, a shift in the focal position caused by a change in the temperature is moderate.

The invention claimed is:

1. An in-vehicle camera lens unit, comprising:
a first lens;
a second lens;
a third lens;
a diaphragm;
a fourth lens;
a fifth lens; and
a sixth lens,
wherein the first lens, the second lens, the third lens, the diaphragm, the fourth lens, the fifth lens, and the sixth lens being disposed in such an order from an object side to an image side while being held in a holder with a cylindrical shape,
wherein
the first lens is a positive lens with a meniscus shape having a convex surface facing the object side and having a concave surface facing the image side,
the second lens is a negative lens with a meniscus shape having a convex surface facing the object side and having a concave surface facing the image side,
the third lens is a negative lens with a meniscus shape having a concave surface facing the object side and having a convex surface facing the image side,
the fourth lens is a positive lens with convex surfaces facing the object side and the image side,
the fifth lens is a negative lens with concave surfaces facing the object side and the image side,
the sixth lens is a positive lens with convex surfaces facing the object side and the image side,
the fifth lens and the sixth lens are a cemented lens,
the holder is made of resin,
the first lens, the second lens, the fourth lens, the fifth lens, and the sixth lens are glass lenses, and
the third lens is a plastic lens.

2. The in-vehicle camera lens unit according to claim 1, wherein
an object-side lens surface and an image-side lens surface of the third lens are aspherical surfaces.

3. The in-vehicle camera lens unit according to claim 2, wherein
in a relationship between a spatial frequency and Modulation Transfer Function in a temperature range of −40° C. to +105° C., with respect to the spatial frequency is 60 lp/mm, an Optical Transfer Function value is 0.5 or more.

4. The in-vehicle camera lens unit according to claim 2, wherein
an F value of an entire lens system including the first lens, the second lens, the third lens, the fourth lens, the fifth lens, and the sixth lens is 1.6 or less.

5. The in-vehicle camera lens unit according to claim 1, wherein
in a relationship between a spatial frequency and Modulation Transfer Function in a temperature range of −40° C. to +105° C., with respect to the spatial frequency is 60 lp/mm, an Optical Transfer Function value is 0.5 or more.

6. The in-vehicle camera lens unit according to claim 5, wherein
an F value of an entire lens system including the first lens, the second lens, the third lens, the fourth lens, the fifth lens, and the sixth lens is 1.6 or less.

7. The in-vehicle camera lens unit according to claim 1, wherein
an F value of an entire lens system including the first lens, the second lens, the third lens, the fourth lens, the fifth lens, and the sixth lens is 1.6 or less.

* * * * *